United States Patent [19]

Anttonen et al.

[11] Patent Number: 5,334,234
[45] Date of Patent: Aug. 2, 1994

[54] NOZZLE ASSEMBLY FOR A FLAT-GLASS TEMPERING MACHINE

[75] Inventors: Kauko K. Anttonen; Jukka H. Vehmas, both of Tampere, Finland

[73] Assignee: Tamglass Engineering Oy, Tampere, Finland

[21] Appl. No.: 10,780

[22] Filed: Jan. 29, 1993

[30] Foreign Application Priority Data

Feb. 12, 1992 [FI]  Finland .................................. 920590

[51] Int. Cl.⁵ ............................................. C03B 27/00
[52] U.S. Cl. ........................................ 65/351; 65/115; 65/348
[58] Field of Search ................... 65/115, 351, 348, 114

[56] References Cited

U.S. PATENT DOCUMENTS 4,767,439  8/1988  Reunamäki et al. .................. 65/351

Primary Examiner—Robert L. Lindsay
Attorney, Agent, or Firm—Burns, Doane, Swecker & Mathis

[57] ABSTRACT

The invention relates to a nozzle assembly for a flat-glass tempering machine. A nozzle cover (2) includes two types of orifices side by side. A number of orifices (7, 8) are linked to the pressure of a compressor (11) and another number of orifices (6) are linked to the pressure of a blower (12). Thus, the different orifices supply air of different pressures.

8 Claims, 3 Drawing Sheets

NOZZLE ASSEMBLY FOR A FLAT-GLASS TEMPERING MACHINE

The present invention relates to a nozzle assembly for a flat-glass tempering machine, comprising a nozzle housing and a nozzle cover provided with orifices, as well as a first and a second compressed-air source having substantially different pressures.

In our prior known nozzle assembly, the same orifices in a nozzle cover are used for blasting both blower air and compressor air. Such an assembly is shown in the accompanying FIG. 4 (prior art). In this prior known system, however, the nozzles cannot be optimally dimensioned and, in addition, the compressor nozzles interfere with the passage of blower air. In this prior known system, the compressor-air nozzles are also located too far from the glass.

The combined action of blower air and compressor air is capable of providing sufficiently effective chilling for tempering thin, less than 4 mm thick pieces of flat glass. For thicker glasses, there is usually no need at all for compressor air.

An object of the invention is to provide an improved nozzle assembly, whereby the dimensions and disposition of nozzles can be optimally selected.

In order to achieve this object, a nozzle assembly of the invention is characterized in that a first number of orifices are linked to a first compressed-air source and a second number of orifices are linked to a second compressed-air source, the different orifices delivering air having a different pressure.

One exemplary embodiment of the invention will now be described in more detail with reference made to the accompanying drawings, in which FIG. 1 shows a vertical section through a nozzle assembly of the invention over a small portion of the cooling station of a tempering machine;

Figure 1:
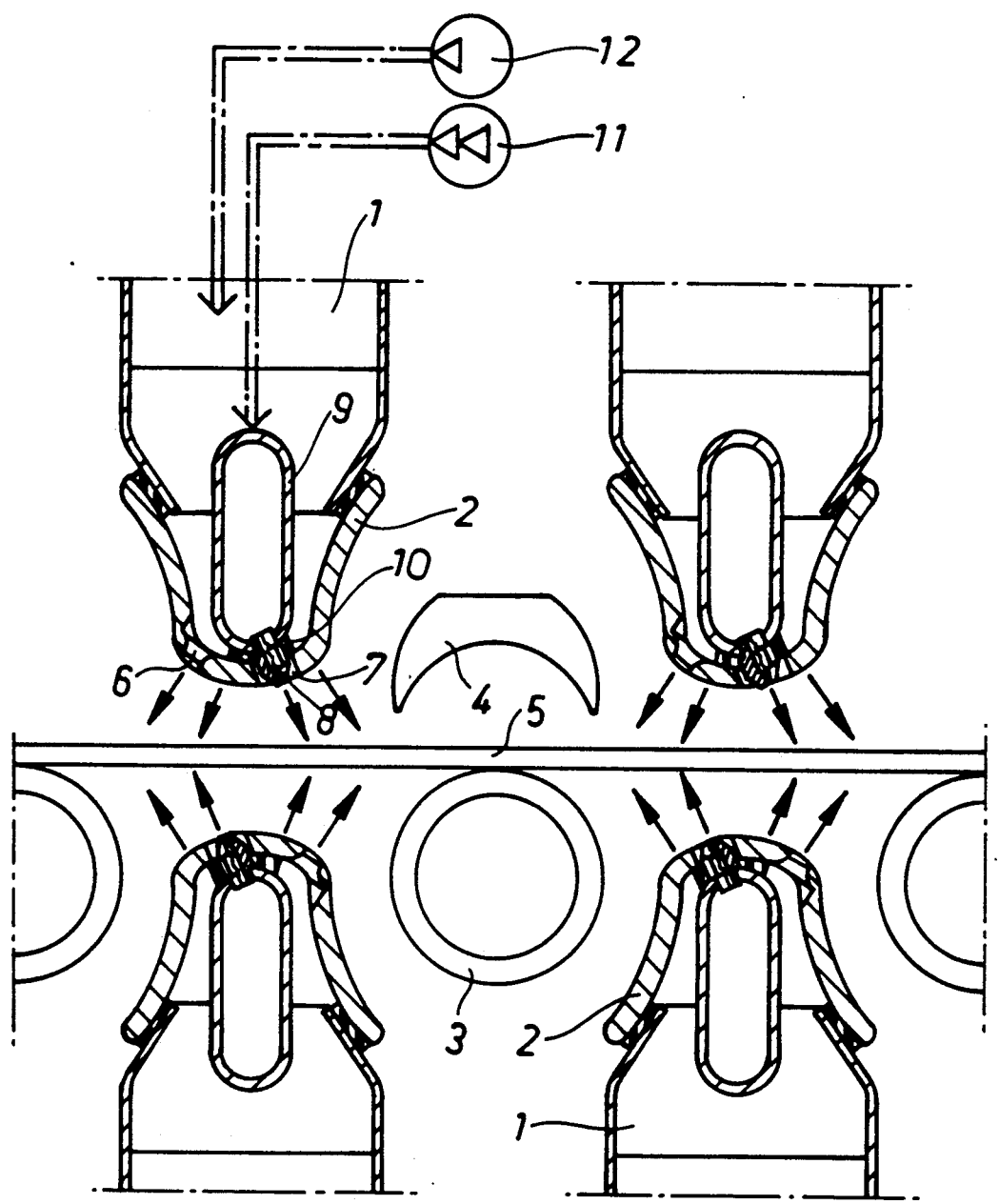

In the cooling station of a flat-glass tempering machine, a glass sheet 5 is oscillated upon horizontal conveyor rolls 3 while the top and bottom surfaces of glass sheet 5 are exposed to powerful cooling-air jets. This is why there are transverse nozzle housings 1 mounted above and below said glass sheet 5. In the illustrated case, said housings 1 are fitted with separate nozzle covers 2. However, the nozzle covers 2 can also be made of the same wall material as housings 1. Above the glass sheet and facing the rolls 3 are false rolls 4, the purpose of which is to increase pressure on the top surface of glass sheet 5 for preventing the glass sheet from floating.

Figure 2:
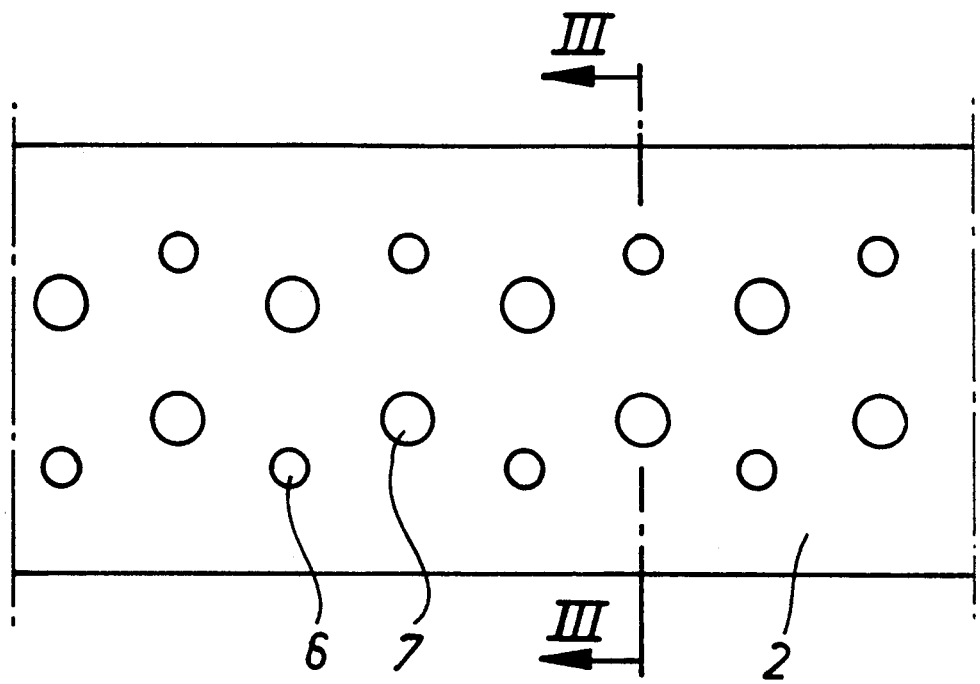
FIG. 2 shows a nozzle cover in a plan view.
Figure 3:
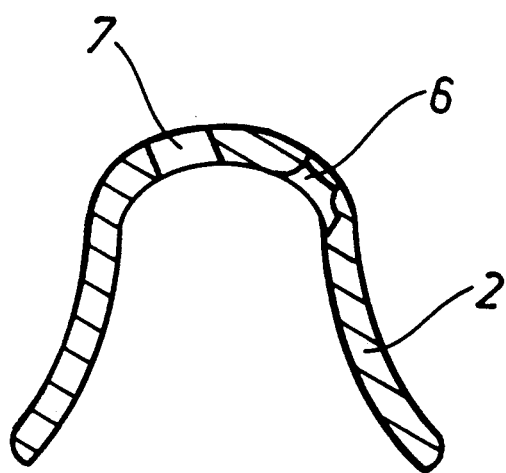
FIG. 3 shows a section along a line III—III in FIG. 2.

As shown also in FIG. 2, the nozzle cover 2 is provided with two types of holes. Holes 6 serve directly as orifices, through which the air to be blasted from blower 12 into housing 1 streams out of said housing 1. Holes 6 are arranged in two different rows with one row on either side of the centre line.

The nozzle cover 2 is also provided with larger holes 7 and these holes are fitted with jet tubes 8 having small orifices for blasting compressor air. Jet tubes 8 are connected to a common supply line 9, wherein the compressed air is delivered from a compressor 11. In addition, the space surrounding jet tube 8 between line 9 and the inner surface of cover 2 is sealed with a packing 10 for preventing an unnecessary and possibly harmful flow through hole 7. Thus, the orifices 7, 8 are exclusively reserved for a high-pressure compressor blast. As shown in FIG. 2, the orifices 7 are also arranged in two parallel rows on either side of the centre line of nozzle cover 2. The orifices 6 and 7, 8 for blasting cooling air of different pressures are located side by side and alternate in the longitudinal direction of a nozzle cover.

In order to design a nozzle cover 2 to be relatively narrow, said supply line 9 is flattened in a manner that its vertical dimension is more than twice its horizontal dimension. Thus, the blower air has an unimpeded passage to orifices 6. Another benefit gained by the narrow design of nozzle covers 2 and housings 1 is to facilitate the blow-off of return air and crumbs.

By virtue of an assembly of the invention it is possible to locate the orifices close to glass. In addition, both types of orifices 6 and 7, 8 are arranged in such a dense pattern that either one alone can be used for a chilling operation whenever the maximum cooling power (for glasses less than 4 mm) is not required. Generally, the blower air is used alone for lower cooling effects.

Figure 4:
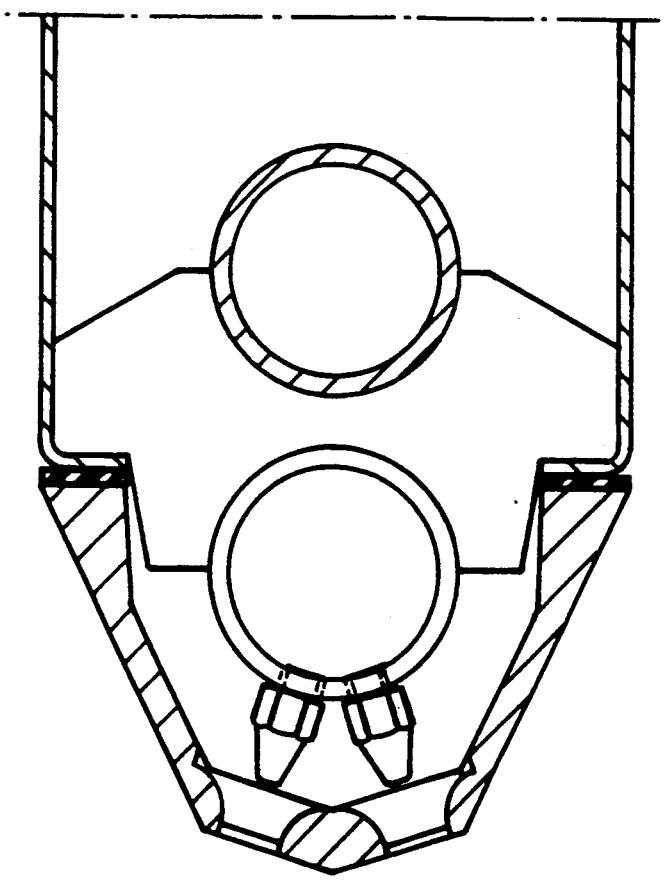
FIG. 4 shows a cross-section through a nozzle housing of the prior art.

An increase in cooling power achieved by means of an assembly of the invention makes it possible to substantially reduce the size of a compressor (compared with the case shown in FIG. 4) and also the size of a blower can be somewhat reduced.

We claim:

1. A cooling assembly for a fiat-glass tempering machine, said tempering machine being provided with a glass sheet supporting conveyor and a plurality of nozzle assemblies positioned above and below said conveyor, each of the nozzle assemblies comprising a nozzle housing and a nozzle cover provided with a plurality of orifices, a first and a second compressed-air source having substantially different pressures, a first portion of the orifices being linked to the first compressed-air source and a second portion of the orifices being linked to the second compressed-air source, the plurality of orifices being included in a common nozzle cover supplying air of different pressures, each of the first and second portion of orifices separately form an orifice pattern sufficiently dense to permit uniform cooling at below maximum rate by one of the first and second portions.

2. A cooling assembly as set forth in claim 1, wherein said first compressed-air source is a compressor and said second compressed-air source is a blower.

3. A cooling assembly as set forth in claim 1, wherein the first portion of orifices are defined by jet tubes fitted in holes included in the nozzle cover.

4. A cooling assembly as set forth in claim 1, wherein the second portion of orifices are defined by holes included in the nozzle cover.

5. A cooling assembly as set forth in claim 3, wherein said jet tubes are connected to a common supply line, which extends parallel to and between conveyor rolls.

6. A cooling assembly as set forth in claim 5, wherein said supply line is flattened in a manner that its vertical dimension exceeds its horizontal dimension.

7. A cooling assembly as set forth in claim 1, wherein said orifices blasting cooling air of different pressures are located side by side and alternate in the longitudinal direction of the nozzle cover.

8. A cooling assembly as set forth in claim 7, wherein the orifices included in the first portion are arranged in at least two parallel rows and orifices included in the second portion are also arranged in at least two parallel rows.

* * * * *